March 10, 1931. S. H. BURNSTAD 1,795,360
COMBINATION ROAD BUILDER, DITCHER, AND BRUSH BREAKER
Filed Dec. 3, 1928 2 Sheets-Sheet 1
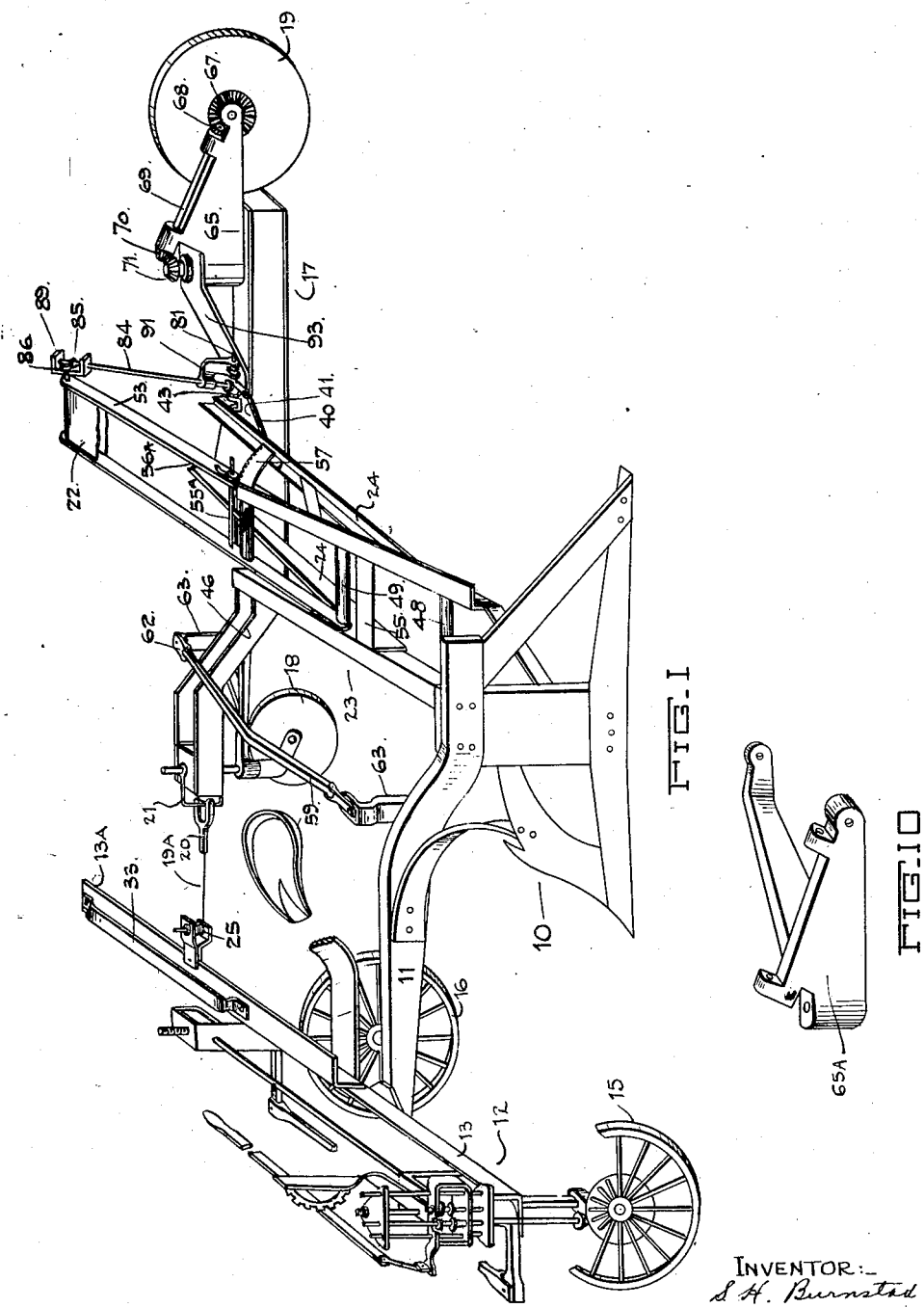
INVENTOR:
S. H. Burnstad
BY
E. J. Featherstonhaugh March 10, 1931.　　　S. H. BURNSTAD　　　1,795,360
COMBINATION ROAD BUILDER, DITCHER, AND BRUSH BREAKER
Filed Dec. 3, 1928　　2 Sheets-Sheet 2
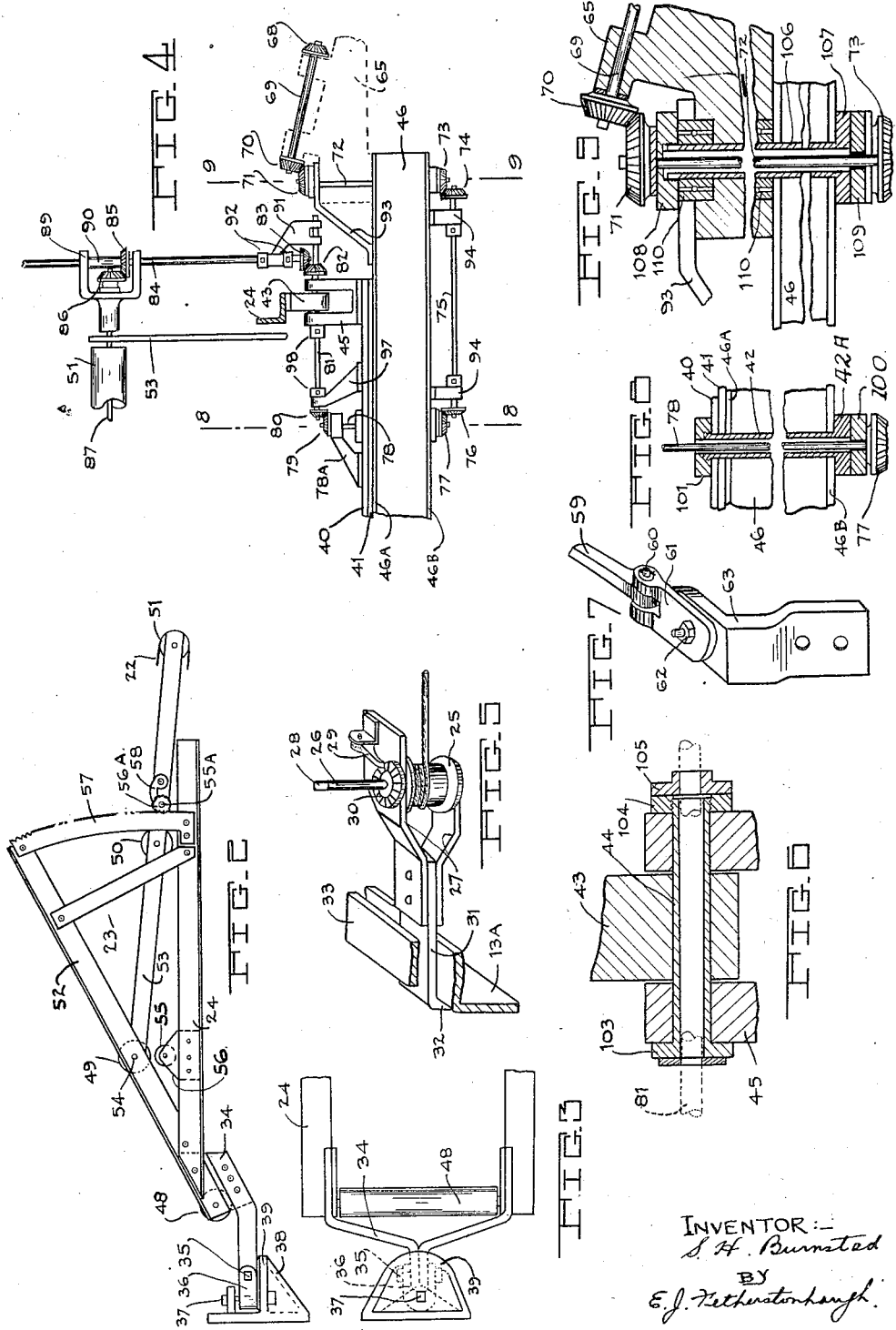

Patented Mar. 10, 1931

1,795,360

UNITED STATES PATENT OFFICE

SIGURD HANS BURNSTAD, OF ROUND HILL, ALBERTA, CANADA

COMBINATION ROAD BUILDER, DITCHER, AND BRUSH BREAKER

Application filed December 3, 1928. Serial No. 323,477.

This invention relates to a combined road builder, ditcher and breaker as described in the present specification and illustrated in the accompanying drawings which form part of the same.

The invention consists essentially of the novel features of construction pointed out broadly and specifically in the claim for novelty following a description containing an explanation in detail of an acceptable form of the invention.

The objects of the invention are to build a device that can be easily operated at the minimum of expense and with accuracy and speed; to construct a conveyor that will be adjustable as to height and width and adapted to be tilted in any direction desired for discharging the earth; to overcome the deficiency in the ordinary road and ditching machines and substitute a machine of comparatively few parts easily accessible and replaceable; and generally to provide a combination road builder, ditcher and brush breaker that will be durable in construction and at a reasonable cost in manufacture.

In the drawings:

Figure 1 is a perspective view of a device built in accordance with this invention, showing the conveyer belt broken away.

Figure 2 is a side elevation of the belt conveyer.

Figure 3 is a fragmentary bottom plan view of Figure 2;

Figure 4 is a diagrammatic view showing means of actuating the drive roller of the belt conveyer from the motion of the rear swivel wheel.

Figure 5 is a perspective view of means of attaching the auxiliary or side truck to the front truck.

Figure 6 is a fragmentary section through one set of side bearings 43 and 45.

Figure 7 is a perspective view of one of the brackets and other parts forming means of retaining the plow and auxiliary truck 17 in an upright position.

Figure 8 is a fragmentary section through the king pin 42 or more particularly on line 8—8 in Figure 4.

Figure 9 is a fragmentary section through the rear swivelled bracket king pin 106 or more particularly on line 9—9 in Figure 4.

Figure 10 is a perspective view of a modified form of the rear swivel bracket.

Like numerals of reference indicate corresponding parts in the various figures.

Referring to the drawings, the plowing unit 10 is rigidly secured to the plow beam 11 which extends forwardly toward the front truck 12 to the cross beam 13 to which it is secured by suitable means such as bolts. The truck has two wheels commonly known as the ground wheel 15 and the furrow wheel 16, adjustable vertically to raise and lower the beam 13 uniformly or to tilt same so as to tilt the plow.

A second truck 17, having the front swivelled wheel 18 and the rear swivelled wheel 19, is hitched or attached to an extension 13A from the cross beam 13 of the truck 12 as with a cable 19A and clevis 20 operating on the U-iron 21 swivelled on the front end of the truck.

The earth is raised or furrowed by the plow, as the device is operated or pulled forwardly, the earth forced up and delivered unto the belt 22 by means of which the earth is conveyed toward the second truck for ultimate discharge or dumping upon the ground.

In order that the front truck 12 and the side truck 17 may independently rise and lower and the truck 17 be spaced nearer to or farther from the plow, the conveyer frame 23 and more particularly the members 24 of said frame must be so hinged as to allow the frame to swing horizontally and vertically. By fastening the truck 17 nearer to or farther from the extension 13A the dirt or earth is discharged nearer to or farther from the front truck while also being dumped farther from or nearer to the furrow being formed. Means are therefore also provided to hitch or attach the truck 17 at different distances from the extension 13A.

The cable 19A may be anchored in and wound around the mandrel or drum 25 rigid on the shaft or spindle 26 journalled in the plates 27; the cable being wound on the drum by turning the shaft with a crank (not shown) fitted on the square end 28 of the shaft, and kept from unwinding by providing a dog 29 co-acting with the gear 30 fast on said shaft. The plates 27 are secured to a bar 31 having the turned down end 32 engaging the front or vertical flange of the beam 13A; the bar being free to slide sideways on the beam 13A below the guide bar 33 while the said guide bar 33 retains the bar 31 in a substantially horizontal position, all as best shown in Figure 5.

From the plow end of the conveyer frame extends a U-shaped bracket 34 hinged with a bolt or pin 35 to a U-shaped member 36 which in turn is hinged as at and with a bolt or pin 37 to a bracket 38 secured to the plow; the bracket 38 having a horizontally arranged flange or surface 39 upon which the member 36 rests or bears, all as best shown in Figures 2 and 3. Thus the conveyer frame is free to swing upwardly about the bolt 35 and to swing sideways or horizontally about the bolt 37. The other ends of the conveyer frame members 24, that is the ends farthest from the plow, may be secured to brackets 43 turning on pivot pins 44 secured in brackets 45; the brackets 45 being secured to a top centre plate 40 turning around a king pin 42 and bearing upon a lower centre plate 41 secured to the top cover plate 46A of the truck beam 46, all as best shown in Figures 4, 6 and 8. Thus the conveyer can swing vertically around the axis of the pivot 44 and swing sideways or horizontally around the king pin 42.

The belt 22 is trained over the rollers 48, 49, 50 and 51 of which 51 is the drive roller; the rollers 48 and 49 being journalled in the members 52 of the conveyer frame, and the rollers 50 and 51 journalled in the members 53 of said frame hinged to the members 52 as at 54. A roller 55 journalled in brackets 56 secured to the members 24 is positioned below the roller 49 to tension the belt 22 when the members 53 are swung down below the members 52 as shown in Figure 2.

The members 53 are swung vertically by turning the shaft 55A with a removable crank (not shown) to turn the ratchet wheels 56A which engage with the quadrants 57 fastened to the members 52 and 24; dogs 58, co-operating with the wheels 56A, releasably lock the wheels in various determined positions along the quadrants.

The truck 17 is retained in a vertical position by a spacing member 59 so hinged at both ends to said truck and plow as to be free to swing upwardly and sideways relative to either; the member 59 being hinged with a pin or bolt 60 to a member 61 which in turn is hinged with a bolt or pin 62 to a bracket 63 secured to the plow and truck respectively, all as best shown in Figures 1 and 7.

If preferred, two rear wheels (not shown) may be used instead of one wheel 19, in which case the swivelled bracket 65 shown in Figure 1 would be made substantially as shown in Figure 10 and indicated as 65A, and the spacing rod 59 and other depending parts dispensed with.

The driving roller 51 may be driven from the rear swivelled wheel 19. Rigid and centred on the wheel 19 is a crown gear 67 meshing with a co-acting bevel gear 68 rigid on the shaft 69 journalled in the bracket 65. Rigid on the shaft 69 is another bevel gear 70 meshing with a co-acting bevel gear 71 rigid on the shaft 72. Rigid on the lower end of the shaft 72 is a bevel gear 73 meshing with a co-acting bevel gear 74 rigid on the shaft 75 journalled in bearings 94. Rigid on the shaft 75 is a bevel gear 76 meshing with a co-acting bevel gear 77 rigid on the shaft 78. Rigid on the shaft 78 is a bevel gear 79 meshing with a co-acting bevel gear 80 rigid on the shaft 81 lying in the axis of one of the hollow pivot pins 44. Rigid on the shaft 81 is a bevel gear 82 meshing with a co-acting bevel gear 83 rigid on the shaft 84 which lies in a vertical plane parallel with a vertical plane passed through either of the members 53. Turning with but free to slide on the shaft 84 is a bevel gear 85 having the extension hub 90 and meshing with a co-acting bevel gear 86 fast on the shaft 87 of the drive roller 51. The shaft 84 is journalled in the bearings 91 and 89 which are free to turn on the shafts 81 and 87 respectively; the shaft 84 being constrained against axial movement as with suitable collars 92 and the shaft 81 being similarly constrained as with suitable collars 98. The king pin 42 is made hollow to allow the shaft 78 to lie and rotate in its axis so that the shaft may be free to rotate while the upper centre plate 40 is also free to turn around the king pin and upon the lower centre plate 41. The king pin may be formed with a head 42A bearing on the bottom cover plate 46B on which head is secured a bearing 100 in which the lower end of the shaft 78 is journalled, the upper end of the shaft 78 is journalled in the bearing 78A the upper end of the king pin being threaded to receive the nut 101 which holds the king pin in position. To similarly allow the shaft 81 to freely rotate in one of the pivot pins 44 which may be formed with a head 103 and threaded to receive a nut 104, a bearing 105 is secured on the nut 104 and journals one end of the shaft while the other end is journalled in the bracket 97. To similarly allow the shaft 72 to freely rotate while the swivel bracket 65 is also free to rotate around the king pin 106, this king pin is made hollow and formed at the lower end with a head 107 and threaded at the upper end to receive a nut or bearing 108, and a bearing 109 secured to the head 107. For obvious reasons a brace 93 and suitable ball bearings 110 are preferably provided as shown in Figures 4 and 9.

Operation: When the device is to be used as a brush breaker, the auxiliary truck 17 is detached by removing the pivot bolt 37 and clevis 21. When used as a road builder and ditcher, the device is left as shown in the drawings or more particularly in Figure 1. By drawing the device forwardly the rotation of the rear wheel 19 causes the endless belt 22 to move. The earth raised by the plow and elevated onto the belt is carried and dumped on to the ground. The dumping position or elevation is altered by raising or lowering the frame or members 53 by turning the shaft 55A and earth discharged nearer to or frather from the plow by unwinding or winding the cable 19A on the drum 25. The front truck is elevated or lowered uniformly by lowering or raising both wheels 15 and 16 equally; either end of the truck is elevated or lowered by lowering or raising the wheel near that end, this being done by working the lever 142 on the quadrant 142A as already described.

What I claim is:

In combined road builders, ditchers and breakers, a front truck having its frame extending transversely beyond the running gear, a plow having its beam extending forwardly to the truck frame and secured thereto and forming a trailer, a tandem truck adjustably secured to and trailing behind the said transverse extension and supported from said plow beam and a transverse conveyer hingedly secured to the plow beam and pivotally supported by said tandem truck and continuously discharging the earth removed by said plow in its forward movement.

Signed at Ottawa, this 15th day of May, 1928.

SIGURD HANS BURNSTAD.